(12) United States Patent
Shirogane et al.

(10) Patent No.: US 7,305,605 B2
(45) Date of Patent: Dec. 4, 2007

(54) STORAGE SYSTEM

(75) Inventors: Tetsuya Shirogane, Yokohama (JP); Tetsuya Uemura, Sayama (JP); Atsushi Tanaka, Saitama (JP)

(73) Assignee: Hitachi, Ltd., Tokyo (JP)

( * ) Notice: Subject to any disclaimer, the term of this patent is extended or adjusted under 35 U.S.C. 154(b) by 309 days.

(21) Appl. No.: 10/629,813

(22) Filed: Jul. 30, 2003

(65) Prior Publication Data

US 2004/0095950 A1 May 20, 2004

(30) Foreign Application Priority Data

Nov. 19, 2002 (JP) ............................. 2002-335301

(51) Int. Cl.
*G06F 15/16* (2006.01)
*H03M 13/03* (2006.01)
*H03M 13/00* (2006.01)
*H04L 1/18* (2006.01)

(52) U.S. Cl. ...................... 714/751; 709/246; 714/786

(58) Field of Classification Search ..................... None
See application file for complete search history.

(56) References Cited

U.S. PATENT DOCUMENTS

| | | | |
|---|---|---|---|
| 5,337,414 A | 8/1994 | Hashemi et al. | |
| 5,450,548 A | 9/1995 | Matsushima | |
| 5,838,891 A | 11/1998 | Mizuno et al. | |
| 6,009,535 A | 12/1999 | Halligan et al. | |
| 6,032,180 A | 2/2000 | Nishikawa | |
| 6,237,052 B1 | 5/2001 | Stolowitz | |
| 6,243,846 B1* | 6/2001 | Schuster et al. ............. 714/776 |
| 6,606,690 B2 | 8/2003 | Padovano | |
| 6,701,456 B1 | 3/2004 | Biessener | |
| 2001/0048709 A1 | 12/2001 | Hoffmann et al. | |
| 2002/0112134 A1 | 8/2002 | Ohran et al. | |
| 2002/0165978 A1* | 11/2002 | Chui ......................... 709/238 |

(Continued)

FOREIGN PATENT DOCUMENTS

EP 0606743 7/1994

(Continued)

OTHER PUBLICATIONS

Frossard, Pascal and Verscheure, Olivier, "Joint Source/FEC Rate Selection for Optimal MPEG-2 Video Delivery," Jul. 30, 2000, IEEE, vol. 3, pp. 1301-1304.*

(Continued)

*Primary Examiner*—Jason Cardone
*Assistant Examiner*—Azizul Choudhury
(74) *Attorney, Agent, or Firm*—Mattingly, Stanger, Malur & Brundidge, P.C.

(57) ABSTRACT

A storage system capable of restoring data even if packets have been lost in exchanges of the data between storage apparatus each conforming to an iSCSI protocol adopting an FEC technique. In a storage system comprising storage apparatus each conforming to an iSCSI protocol adopting an FEC technique, each of the storage apparatus is provided with an FEC function and, when data is transmitted from an iSCSI layer to another iSCSI layer, the state of an FEC process and a redundancy of the data transmission are changed to values suitable for a transmission destination prior to the transmission so that the data can be restored at the destination of transmission.

19 Claims, 14 Drawing Sheets

U.S. PATENT DOCUMENTS

| | | |
|---|---|---|
| 2003/0097607 A1 | 5/2003 | Bessire |
| 2003/0105767 A1 | 6/2003 | Sonoda et al. |
| 2003/0105921 A1 | 6/2003 | Tomita |
| 2003/0126522 A1 | 7/2003 | English et al. |
| 2003/0177174 A1 | 9/2003 | Allen et al. |
| 2003/0182610 A1 | 9/2003 | Bushmitch et al. |
| 2003/0226092 A1 | 12/2003 | Kim et al. |
| 2004/0010612 A1 | 1/2004 | Pandya |
| 2004/0049553 A1 | 3/2004 | Iwamura et al. |
| 2004/0098394 A1 | 5/2004 | Merritt et al. |

FOREIGN PATENT DOCUMENTS

| | | |
|---|---|---|
| JP | 4233025 | 8/1992 |
| JP | 2000-174731 | 6/2000 |
| JP | 200186153 | 3/2001 |
| WO | 0076113 | 12/2000 |

OTHER PUBLICATIONS

Lawabni, Abed et al. "Packet Loss Recovery Hybrid Scheme for Image Multicast Applications," 2002, IEEE, vol. 2, pp. 1981-1984.*

Japanese Patent Laid-open No. 2001-7785.

Japanese Patent Laid-open No. 2001-168944.

* cited by examiner

|  | BIT |  |  |  |
|---|---|---|---|---|
|  | 0 0 1 2 3 4 5 6 7 8 9 | 1 0 1 2 3 4 5 6 7 8 9 | 2 0 1 2 3 4 5 6 7 8 9 | 3 0 1 |
| WORD 0 | ENCODING INFORMATION | CONTROL INFORMATION TYPE | FEC CONTROL INFORMATION ID | |
| WORD 1 | FEC CONTROL INFORMATION (DEPENDING ON CONTROL INFORMATION TYPE) | | | |
| WORD 2 | FEC CONTROL INFORMATION (DEPENDING ON CONTROL INFORMATION TYPE) | | | |
| WORD 3 | FEC CONTROL INFORMATION (DEPENDING ON CONTROL INFORMATION TYPE) | | | |

FIG. 7

FEC PERMISSION TABLE 119

| iSCSI NAME OF COMMUNICATION PARTNER | INITIAL REDUNDANCY (n) |
|---|---|
|  |  |
|  |  |
|  |  |

FEC TRANSMISSION MANAGEMENT TABLE 117

| DESTINATION ADDRESS | REDUNDANCY (n) | FEC ENCODING BUFFER CONTROL INFORMATION |
|---|---|---|
|  |  |  |
|  |  |  |
|  |  |  |
|  |  |  |

FEC RECEPTION MANAGEMENT TABLE 118

| SOURCE ADDRESS | PACKET ARRIVAL RATIO | FEC DECODING BUFFER CONTROL INFORMATION |
|---|---|---|
|  | / |  |
|  | / |  |
|  | / |  |
|  | / |  |

STORAGE SYSTEM

BACKGROUND OF THE INVENTION

1. Field of the Invention

The present invention relates to a storage system. More particularly, the present invention relates to a method of communicating data between storage apparatus such as RAIDs connected to each other by a network or between a storage apparatus and a host, which are also connected to each other by a network, and relates to the configuration of a storage device for implementing the method.

2. Description of the Related Art

Popularization of IP storages and a rising demand for remote copying of data have resulted in more frequent data transfers between storage apparatus, which are separated from each other by long distances and connected to each other by a network, or between a storage apparatus and a server, which are also separated from each other by long distances and connected to each other by a network. In addition, the amount of transferred data has been increasing year after year so that it becomes necessary to transmit data having a large amount at a high speed with a high degree of reliability.

As an interface between a server and a storage apparatus connected to the server, a Fibre Channel and an SCSI interface are known. The Fibre Channel is adopted as a standard interface, which composes a SAN (Storage Area Network) and is used for transferring data at a high speed. On the other hand, the SCSI interface offers merits of a high data transmission speed, a short transmission delay and an extremely low probability of transmission error generation. Thus, the SCSI interface is used as a popular conventional protocol for storage apparatus. However, the SCSI interface has a problem of limiting applications of the SCSI interface to only communications at short transmission distances.

In recent years, trials have been made to connect storage apparatus to each other by adopting an iSCSI protocol. The iSCSI protocol is a protocol technology for implementing SCSI processing as an interface technology on a TCP/IP, which is a network technology. At the present time, the IETF (the Internet Engineering Task Force) is carrying out work of standardization of the iSCSI protocol. It is expected that there will be many cases in which packets are lost at an IP layer when data is transferred by adoption of the iSCSI protocol between storage apparatus separated from each other by a long distance.

In general, as a countermeasure for tackling the phenomenon of losing packets in communication of data, there are known an ARQ (Automatic Repeat reQuest) technique, i.e., an automatic retransmission request technique, and an FEC (Forward Error Correction) technique. When data is transmitted over a long distance, it is quite within the bounds of possibility that packets of the data are lost. In consequence, when data is communicated by adoption of the ARQ technique, it takes time to retransmit data and, as a result, the data transmission efficiency decreases. In particular, a network delay included in the time it takes to retransmit data in a data transmission over a long distance increases in proportion to the distance. For this reason, the ARQ technique cannot be said to be a desirable countermeasure.

For example, in Japanese Patent Laid-open No. 2001-7785, there is disclosed a technology adopting both the FEC and ARQ techniques. In accordance with this technology, a communication partner is informed of an error control technique suitable for the line quality of the transmission network by adding a unique word to transmitted data and, on the receiver side, the data is decoded in dependence on the unique word. In addition, in Japanese Patent Laid-open No. 2001-168944, there has been proposed a technique for transmitting 2 or more types of data having different attributes, namely, ISO data and ASY data, and, on the receiver side, processing is carried out to receive the data in accordance with the attributes.

However, the above publications neither describe a relation with storage apparatus nor disclose ways to keep up with changes in FEC redundancy.

SUMMARY OF THE INVENTION

It is thus an object of the present invention to provide a communication method that is capable of restoring transmitted data in a data transmission through a network even if packets of the data are lost.

It is another object of the present invention to provide a storage apparatus conforming to the iSCSI protocol adopting the FEC technique.

It is a further object of the present invention to provide a storage system that is capable of transmitting data by changing the status of an FEC process and the redundancy of a data transmission between iSCSI layers in accordance with the destination of the data transmission and capable of restoring the transmitted data.

In order to achieve the objects described above, the present invention provides a system with each of storage apparatus thereof adopting an iSCSI protocol and each data exchanged between iSCSI layers in a storage system in which the storage apparatus are connected to each other by a network or the storage apparatus are connected to a host computer by a network. The host computer has the general meaning of a computer including a server. Each of the storage apparatus has an FEC control unit. On the transmitter side, the FEC control unit carries out redundancy conversion processing on data to be transmitted in an encoding process and transmits a group of redundancy packets of the data completing the redundancy conversion processing to the network. On the other hand, by using the group of redundancy packets received from the network as a base, the receiver restores the received data in FEC units in a decoding process. By carrying out the encoding process to carry out the redundancy conversion processing on the data to be transmitted and the decoding process to restore the received data as described above, the original group of packets can be restored even if some of redundancy packets in the group are lost and, thus, cannot be received. If the data cannot be restored on the receiver side, on the other hand, the transmitter can retransmit the data typically upon detection of a monitored timeout. The detected timeout is caused by the fact that the receiver does not transmit an ACK to the transmitter.

The present invention is capable of changing the FEC redundancy for packets to be transmitted. To be more specific, the state of redundancy on the transmitter side is changed in accordance with the state of the packet loss on the receiver side. As a typical means for changing the redundancy, for example, it is possible to change the ratio of the amount of data subjected to the encoding process to carry out redundancy processing on data to be transmitted to the amount of data to be exchanged. In addition, a packet loss ratio can be acquired for each destination of transmission. The packet loss ratio is defined as a ratio of the number of lost packets to the number of all packets in the group, which are supposed to be received by the receiver. The transmitter then transmits data to a destination of transmission by changing the redundancy of the data on the basis of the packet loss ratio acquired from the destination. In the case of a high packet loss ratio, for example, data is transmitted by raising the FEC redundancy. In the case of a low packet loss ratio, on the other hand, data is transmitted by lowering the FEC redundancy. The packet loss ratio is expected to change sometimes in dependence on the network. In this case, the redundancy is changed in accordance with the variations in the packet loss ratio. In addition, it is possible to change intervals at which packets are transmitted in accordance with the packet loss ratio. Thus, in a broad sense, the state of data transmission can be changed in accordance with the packet loss ratio.

A preferred embodiment comprises: a transmission management table for cataloging an FEC redundancy for each destination of transmission and for managing the FEC redundancies; a reception management table for cataloging an FEC redundancy for each source of transmission and for managing the FEC redundancies; an encoding unit for carrying out an FEC encoding process on iSCSI-layer packet data, which is generated by a storage apparatus for a destination of transmission, by referencing the transmission management table and providing the data with a redundancy for the destination of transmission; and a decoding unit for carrying out an FEC decoding process on packet data received from a network in order to decode the packet data back into the iSCSI-layer data. This preferred embodiment can be built as an adapter connected to or embedded in a storage apparatus.

In addition, the present invention is capable of implementing a communication method for transmitting data between iSCSI layers by way of a network in a storage system adopting the iSCSI protocol. The communication method has a first communication mode for transmitting and receiving data in a communication mode including an FEC process, a second communication mode for transmitting and receiving data in a TCP/IP communication mode, forming a judgment as to whether or not a partner serving as a data communication destination has an iSCSI layer on the basis of the existence of an iSCSI Name, carrying out an FEC process based upon an FEC redundancy provided for a communication partner on data to be transmitted and transmitting the data completing the FEC process to the partner in the first communication mode to the partner in a case where an outcome of the judgment indicates that the partner has an iSCSI layer, and transmitting data to a communication partner in the second communication mode in a case where an outcome of the judgment indicates that the partner does not have an iSCSI layer.

In accordance with a preferred embodiment implementing a storage system for communicating data between iSCSI layers, a transmission of an iSCSI login frame for starting a TCP session is monitored and, in the case of a session with a communication partner determined in advance, the redundancy of data is changed in an increasing direction when the data is transmitted to the destination address of the communication partner as long as this session continues to exist. The communication partner is an iSCSI node such as an iSCSI initiator or an iSCSI target.

BRIEF DESCRIPTION OF THE DRAWINGS

FIG. 7 is a diagram showing typical information cataloged in an FEC control table, an FEC transmission management table and an FEC reception management table.

DESCRIPTION OF THE PREFERRED EMBODIMENTS

Figure 1:
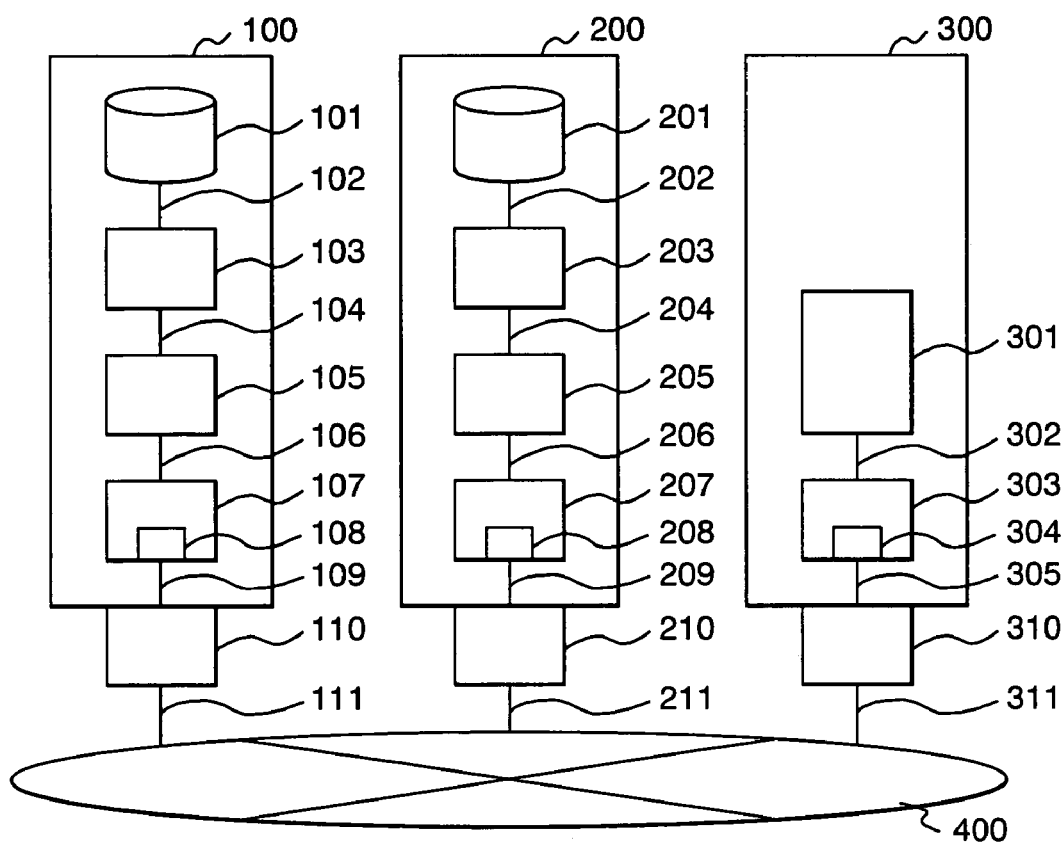
FIG. 1 is a block diagram showing a storage system implemented by an embodiment of the present invention.

Embodiments of the present invention will be described below by referring to the drawings.

FIG. 1 is a block diagram showing a storage system connected to a network in accordance with an embodiment of the present invention. As shown in the figure, an IP network 400 is connected to storage apparatus 100 and 200 as well as a host computer 300, which is referred to hereafter simply as the host 300. In this storage system, data having a packet format is exchanged by way of the IP network 400 between the storage apparatus 100 and 200 or between the storage apparatus 100 or 200 and the host 300. Data is communicated between the storage apparatus 100 and 200 typically in a remote copy operation. On the other hand, data is communicated between the storage apparatus 100 or 200 and the host 300 for example in data processing or when the storage apparatus 100 or 200 is used as a data station. The storage system is characterized in that the storage apparatus 100 and 200 and the host 300 are provided with FEC conversion adapters 110, 210 and 310 respectively at their outlets of connection with the IP network 400.

The storage apparatus 100 comprises normally a disk drive 101, a disk adapter 103 connected to the disk drive 101 by an SCSI interface 102, a cache memory 105 connected to the disk adapter 103 by a bus 104 and a channel adapter 107 connected to the cache memory 105 by a bus 106. By the same token, the storage apparatus 200 comprises normally a disk drive 201, a disk adapter 203 connected to the disk drive 201 by an SCSI interface 202, a cache memory 205 connected to the disk adapter 203 by a bus 204 and a channel adapter 207 connected to the cache memory 205 by a bus 206. A port 108 of the channel adapter 107 is connected to an FEC (Forward Error Correction) conversion adapter 110 by a high-speed IP interface 109. The FEC conversion adaptor 110 is connected to the IP network 400 by a high-speed IP interface 111. By the same token, a port 208 of the channel adapter 207 is connected to an FEC conversion adapter 210 by a high-speed IP interface 209. The FEC conversion adaptor 210 is connected to the IP network 400 by a high-speed IP interface 211. An example of the high-speed IP interfaces 109 and 209 is the Gigabit Ethernet (a registered trademark). The channel adapters 107 and 207 each carry out an iSCSI-protocol process. It is to be noted that the high-speed IP interface 111 connects a port of the FEC conversion adapter 110 to the IP network 400 but the port itself is not shown in the figure. By the same token, the high-speed IP interface 211 connects a port of the FEC conversion adapter 210 to the IP network 400 but the port itself is also not shown in the figure.

The host 300 includes an information-processing apparatus 301 serving as an information generation unit and an iSCSI host bus adapter (HBA) 303 connected to the information-processing apparatus 301 by an internal bus 302. The information-processing apparatus 301 has a processing unit or a memory. A port 304 of the iSCSI HBA 303 is connected to an FEC conversion adapter 310 by a high-speed IP interface 305. The FEC conversion adapter 310 is connected to the IP network 400 by an IP interface 311. The iSCSI HBA 303 employed in the host 300 carries out host input/output processing and issues a command in accordance with an instruction received from an OS (Operating System) of the host 300.

The FEC conversion adapters 110, 210 and 310 connected to the storage apparatus 100, the storage apparatus 200 and the host 300 respectively encode and decode FEC codes. A detailed configuration of each of the FEC conversion adapters 110, 210 and 310 will be described in detail later.

It is to be noted that the IP network 400 may also be connected to conventional storage apparatus and a conventional host, which do not have the FEC conversion adapters 110, 210 and 310, even though such conventional storage apparatus and such a conventional host are not shown in FIG. 1.

Figure 2:
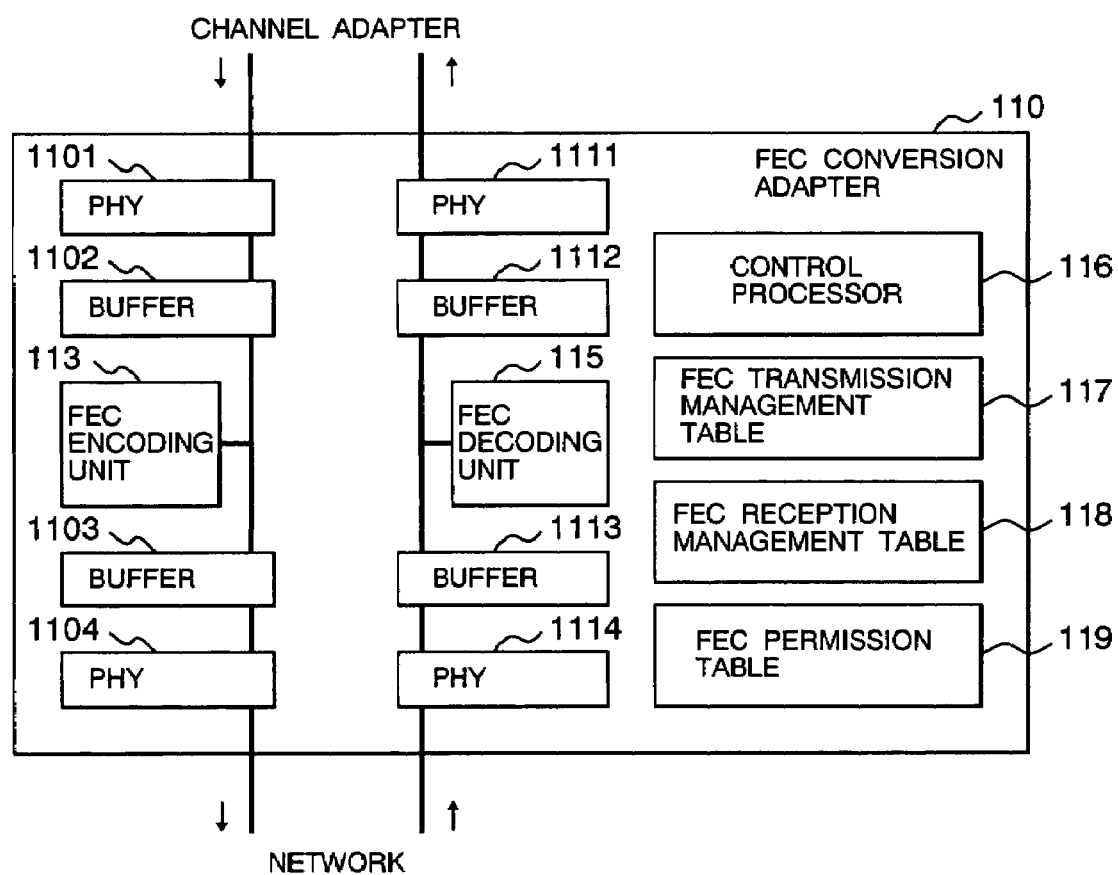
FIG. 2 is a block diagram showing a typical storage apparatus employing an FEC conversion adapter implemented by an embodiment of the present invention.

FIG. 2 is a diagram showing the internal configuration of the FEC conversion adapter connected to a storage apparatus in the embodiment of the present invention. As an example of the storage apparatus, the FEC conversion adapter 110 comprises both a transmission system and a reception system. The transmission system includes a physical layer 1101 on the side of the storage apparatus 100, a buffer 1102 for temporarily storing packet data received from the storage apparatus 100, an FEC encoding unit 113 for carrying out an FEC encoding process on packet data to be transmitted, a transmission buffer 1103 for temporarily storing data completing the FEC encoding process and a physical layer 1104. The physical layer 1104 is connected to the IP network 400 by the high-speed IP interface 111.

On the other hand, the reception system comprises a physical layer 1114, a buffer 1113 for temporarily storing received data, an FEC decoding unit 1115, a buffer 1112 and a physical layer 1111. The FEC decoding unit 1115 carries out an FEC decoding process on received packet data in order to decode the data.

In addition, the FEC conversion adapter 110 also includes a control processor 116, an FEC transmission management table 117, an FEC reception management table 118 and an FEC permission table 119. The control processor 116 executes entire control in the FEC conversion adapter 110. The FEC transmission management table 117 is a table for cataloging addresses of partner apparatus to which data can be transmitted from the storage apparatus 100. Examples of such a partner are another storage apparatus and a host. The FEC permission table 119 is a table for executing management as to whether or not an FEC communication is permitted. The FEC permission table 119 is a table for cataloging codes used for identifying a communication partner. It is to be noted that the structures of these tables will be described later by referring to FIG. 7.

If the address of a communication destination has been cataloged in the FEC transmission management table 117, data to be transmitted to the communication destination is subjected to an FEC process in the FEC encoding unit 113 before being transferred to the IP network 400. If the address of a communication destination has not been cataloged in the FEC transmission management table 117, on the other hand, data to be transmitted to the communication destination is transferred to the IP network 400 without being subjected to an FEC process in the FEC encoding unit 113. The FEC process of the data to be transmitted, that is, iSCSI data, is carried out in accordance with the communication destination's redundancy, which is also cataloged in the FEC transmission management table 117. As a redundancy code, it is possible to use for example a parity-bit code produced by the commonly known XOR process or the Reed Solomon code.

The FEC reception management table 118 is a table for cataloging addresses of, among others, storage apparatus each serving as a transmission source. If the address of a transmission source has been cataloged in the FEC reception management table 118, the FEC decoding unit 115 carries out an FEC decoding process on data received from the transmission source in order to decode the data into iSCSI data, which is internal data. If the address of a transmission source has not been cataloged in the FEC reception management table 118, on the other hand, the data received from the transmission source is passed on to the iSCSI layer without being subjected to an FEC decoding process in the FEC decoding unit 115.

The FEC permission table 119 is a table used as a ledger for controlling communication partners. A redundancy is cataloged in the FEC permission table 119 for each iSCSI Name representing a communication partner.

Figure 3:
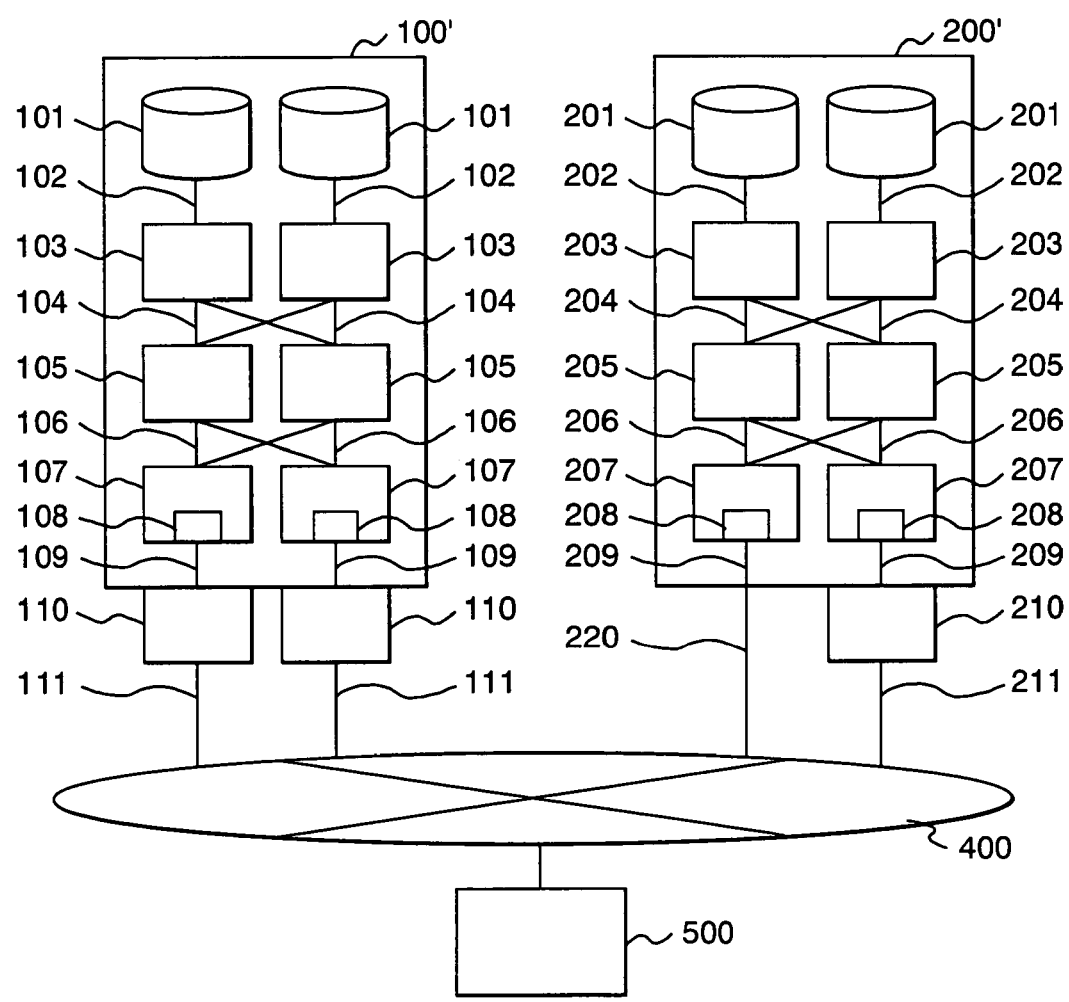
FIG. 3 is a block diagram showing a storage system implemented by another embodiment of the present invention.

FIG. 3 is a block diagram showing a storage system implemented by another embodiment of the present invention. In the case of this embodiment, in order to improve reliability, the storage apparatus 100' comprises two disk drives 101, two disk adapters 103, two cache memories 105 and two channel adapters 107. By the same token, the storage apparatus 200' comprises two disk drives 201, two disk adapters 203, two cache memories 205 and two channel adapters 207. To keep up with these double components, 2 FEC conversion adapters 110 and an FEC conversion adapter 210 are provided and connected to the IP network 400. Each of the FEC conversion adapters 110 and 210 has encoding and decoding functions. In this embodiment, a high-speed interface 220 is used for directly connecting the port 208 of the channel adapter 207 to the IP network 400 without using an FEC conversion adapter 210 as is the case with the conventional port.

As a further embodiment, a management server 500 may be connected to the IP network 400. The management server 500 is a server for managing the FEC transmission management table 117, the FEC reception management table 118 and the FEC permission table 119, which are included in each of the FEC conversion adapters 110, 210 and 310. To put it in detail, by issuing a command to add or delete a communication destination such as a port, the management server 500 executes control as to whether or not the FEC technique is to be applied to a communication between FEC conversion adapters. The control is executed by using a management table as a table for cataloging addresses of FEC conversion adapters or ports for which communications are to be carried out by adoption of the FEC technique. It is needless to say that the addresses of a conventional storage apparatus and a conventional host are not cataloged in the management table. Thus, the effect of the FEC technique cannot be enjoyed.

Figure 4:
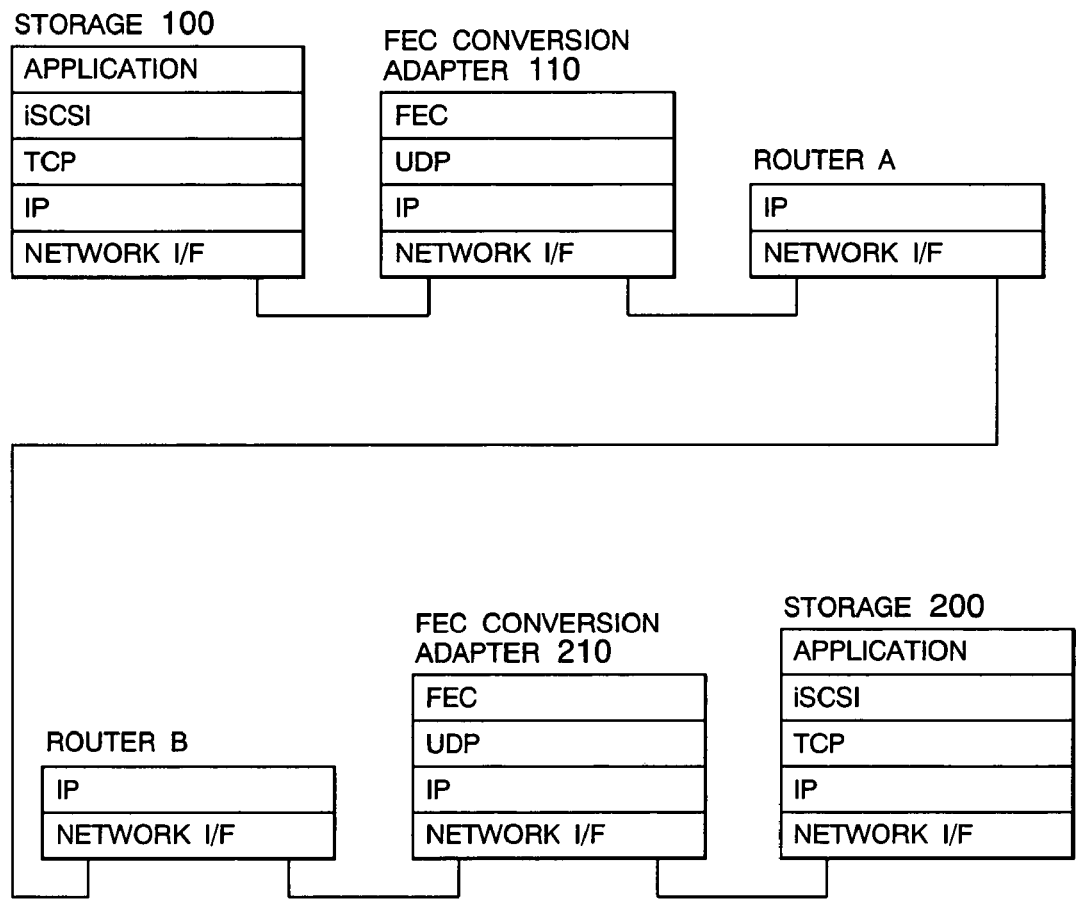
FIG. 4 is a diagram showing the concept of a data transfer according to an embodiment of the present invention.

FIG. 4 is a diagram showing the concept of a data transfer according to an embodiment of the present invention. The figure shows a case in which data is transferred from the storage apparatus 100 to the storage apparatus 200 by way of routers A and B as well as the IP network 400 for great distances. It is to be noted that the destination of the data transfer is not limited to the storage apparatus 200. Instead, a host or a server is capable of serving as the destination of the data transfer provided that the host or the server has an FEC conversion adapter.

Data processed at an application layer of the storage apparatus 100 is subjected to a protocol conversion process at an iSCSI layer. Then, control information for TCP and IP layers is added to the data in a process to convert the data into a packet before the data is supplied to the FEC conversion adapter 110 by way of a network interface (I/F).

The FEC conversion adapter 110 carries out an FEC process (or an encoding process) to add a redundancy code for error correction to the data to be transmitted. This encoding process will be described in detail later. After the encoding process, the port number of a UDP header is added. Then, the data is further subjected to a process to convert the data into an IP packet before the data is supplied to router A by way of a network I/F. Finally, the data is output to the IP network 400 by way of route A's IP layer and network I/F.

On the receiver side, on the other hand, the data is received and supplied to the FEC conversion adapter 210 by way of router B's IP layer and network I/F. In the FEC conversion adapter 210, the received data is supplied to an FEC layer by way of a network I/F, an IP layer and a UDP layer. At the FEC layer, the data is subjected to an FEC decoding process. This decoding process will be described later in detail. Anyway, in this FEC decoding process, the FEC redundancy code is used for correcting errors. If the number of errors is large, an ACK can by no means be returned to the transmitter side in response to the received data. For this reason, the transmitter side monitors a timeout for reception of the ACK. If the ACK is not received within a predetermined period of time, the same data is transmitted again to the receiver side. Data completing the decoding process is finally supplied to the storage apparatus 200 in which the data is supplied to an application layer by way of the same layers as the storage apparatus 100. At the application layer, the data is used in an application.

Figure 5:
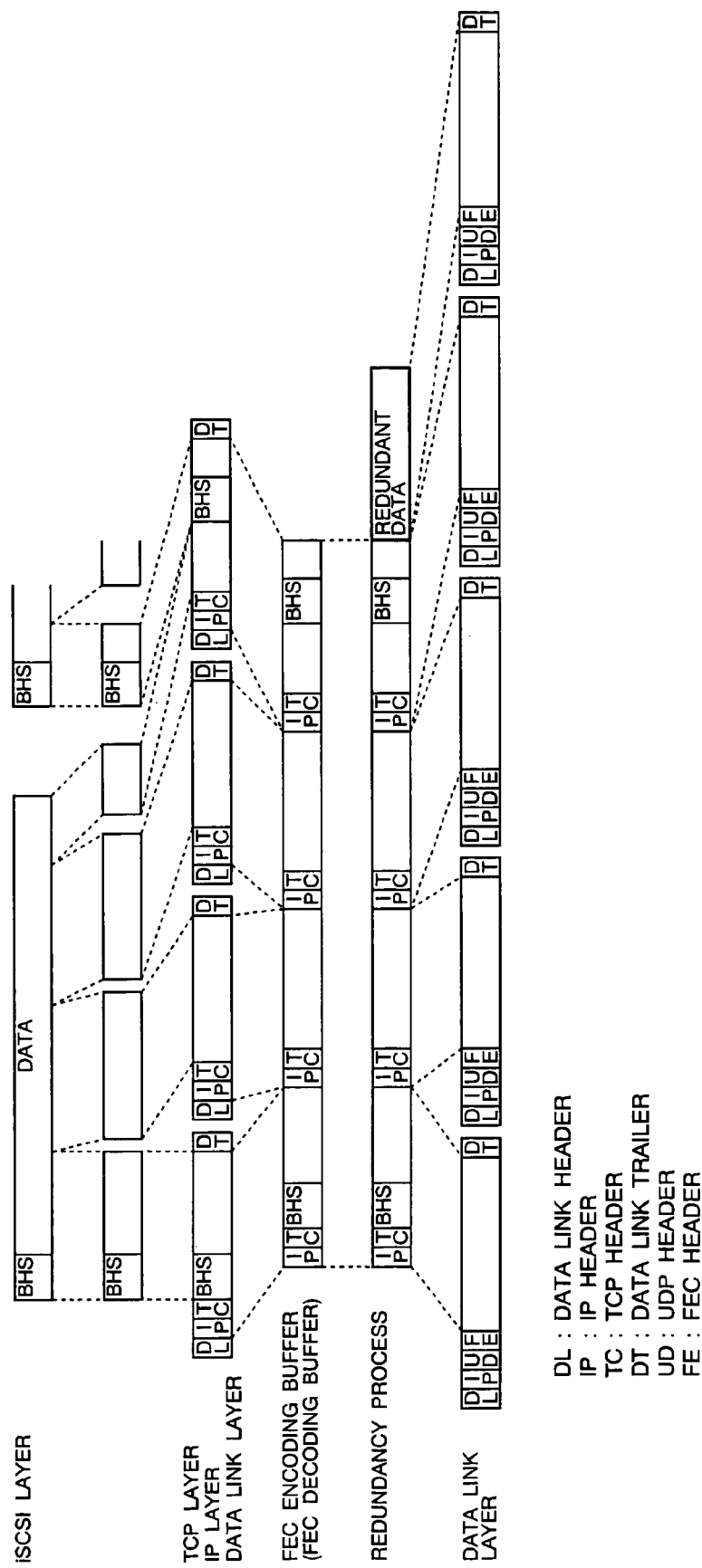
FIG. 5 is a diagram showing a typical format of a packet used in communications.

FIG. 5 is a diagram showing a typical format of the packet used in communication. On an iSCSI layer, an iSCSI PDU (Protocol Data Unit) used as a unit of data communication comprises a BHS (Basic Header Segment) and a data segment. It is to be noted that the iSCSI PDU may include an AHS (Additional Header Sequence) between the BHS and the data segment. However, the AHS is omitted from the typical format shown in the figure. The BHS includes the length of the message. From the BHS, the start position of the data segment and the boundaries of the message are known. At the iSCSI layer, an initiator and a target carry out a communication by exchanging a message called the iSCSI PDU. The length of the iSCSI PDU is a multiple of four bytes.

At TCP, IP and data-link layers, a data link header (DLH), an IP header (IPH) and a TCP header (TCPH) are added to the head of the packet data received from the iSCSI layer described above. On the other hand, a data link trailer (DLT) is added to the tail of the iSCSI packet data. It is to be noted that, in the case of the Ethernet, an Ethernet header is used as the data link header.

The buffer (encoding buffer) 1102 shown in FIG. 2 is used for storing the headers to be sequentially added to the iSCSI packet data. The iSCSI packet data including the IP header, the TCP header and other information is subjected to a redundancy conversion process. In addition to the data link header (DLH), the IP header (IPH) and the TCP header (TCPH), a UDP header and an FEC header are further added to the data completing the redundancy conversion process prior to a transmission.

In accordance with the present invention, in order to carry out an FEC communication, a WWN (World Wide Name), that is, an iSCSI Name, is cataloged in the FEC permission table to be used in issuing a command or the like to a communication destination. An iSCSI login is monitored. If the iSCSI login is determined to be a login for a communication destination already cataloged in the FEC permission table, an FEC communication is started by cataloging the address of the communication destination in the aforementioned FEC transmission management table and the aforementioned FEC reception management table. An IP address is typically assigned to a port on a one-to-one basis. However, a plurality of iSCSI Names can also be set for a storage apparatus. For example, a storage apparatus is divided into a plurality of partitions to be used as a plurality of disks. In this case, a plurality of iSCSI Names is set for a physical port. This way of utilization is very meaningful to the user of the storage device. A reason why communication destinations are managed by using iSCSI Names such as "iqn.1993-11.com.disk-vendor.diskarrays.sn.45678" in place of, for example, IP addresses, is that, for the user of the storage apparatus, an iSCSI Name is easier to remember than an IP address is, and it is easier to give a meaning to an iSCSI Name than an IP address. In addition, if communication destinations are managed by using IP addresses, an IP address must be set anew in a case where a network I/F card or a network adapter card is changed or the connecting network is changed. If communication destinations are managed by using iSCSI Names, on the other hand, there is no such necessity. Moreover, in comparison with an iSCSI Name, it is quite within the bounds of possibility that an IP address is used incorrectly.

Figure 6:
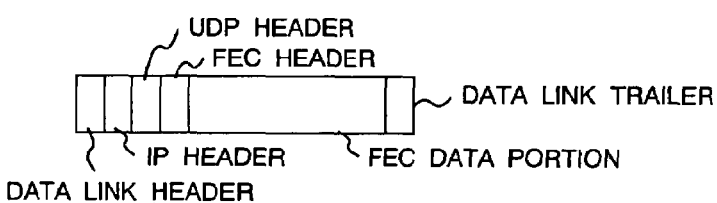
FIG. 6 is a diagram showing the format of an FEC header.

FIG. 6 is a diagram showing the format of the FEC header. The length of the FEC header is 32 bits or 4 words. Word 0 contains encoding information, the type of FEC information and an FEC control information ID. The contents of FEC control information stored in words 1, 2 and 3 change in dependence on the type of the FEC information. The encoding information is information indicating whether or not the FEC data portion has been subjected to a redundancy conversion process. The type of the FEC information is information indicating a change in information stored in the FEC permission table, a change in control table information, FEC_ACK, a report on a packet loss ratio, data and the type of redundancy data. The FEC control information ID is used for indicating control information corresponding to FEC_ACK and FEC_RJT. The FEC control information includes a data length, a redundancy and a packet arrival ratio. The FEC data portion is included in a data packet and a redundancy packet if the FEC control packet includes an iSCSI Name.

FIG. 7 is a diagram showing typical contents of the FEC control table, the FEC transmission management table and the FEC reception management table.

The FEC permission table 119 is provided for each FEC adapter as a table functioning as the so-called ledger for executing management as to whether or not the communication partner is a target of an FEC communication. For this reason, the FEC permission table 119 is used for storing the iSCSI Name and the redundancy, which are associated with a communication partner, for each communication partner. When a login is carried out for an iSCSI Name cataloged in this FEC permission table 119, information is cataloged in the FEC transmission management table 117 or the FEC reception management table 118. It is to be noted that, for a communication partner whose iSCSI Name has not been cataloged in the FEC permission table 119, the ordinary TCP/IP communication can be carried out.

The FEC transmission management table 117 is a table used for cataloging the address, the redundancy and the encoding buffer control information for each transmission destination. The address of a transmission destination is also referred to as a destination address. In this case, typically, an IP address is cataloged as the destination address. If a destination address has been cataloged in the FEC transmission management table 117, the iSCSI data, which is the data to be transmitted, is subjected to an FEC process carried out by the FEC encoding unit 113 and then transmitted to the IP network 400. That is to say, the data is transmitted in an FEC communication mode. If a destination address has not been cataloged in the FEC transmission management table 117, on the other hand, the iSCSI data is transmitted to the IP network 400 in a TCP/IP communication mode without being subjected to an FEC process carried out by the FEC encoding unit 113.

The FEC reception management table 118 is a table used for cataloging a packet arrival ratio and FEC decoding buffer control information for each source address. As the source address, the IP address of the transmission source is cataloged. A packet loss ratio is found from the packet arrival ratio and eventually reflected in a change in redundancy, that is, a change made by the transmission source.

It is to be noted that an iSCSI Name column can be added to each of the FEC transmission management table 117 and the FEC reception management table 118. On this column, iSCSI Names are cataloged. An iSCSI Name obtained from the FEC permission table 119 is used to search the FEC transmission management table 117 or the FEC reception management table 118 for the iSCSI Name's row, to or from which information is to be added or deleted.

Figure 8:
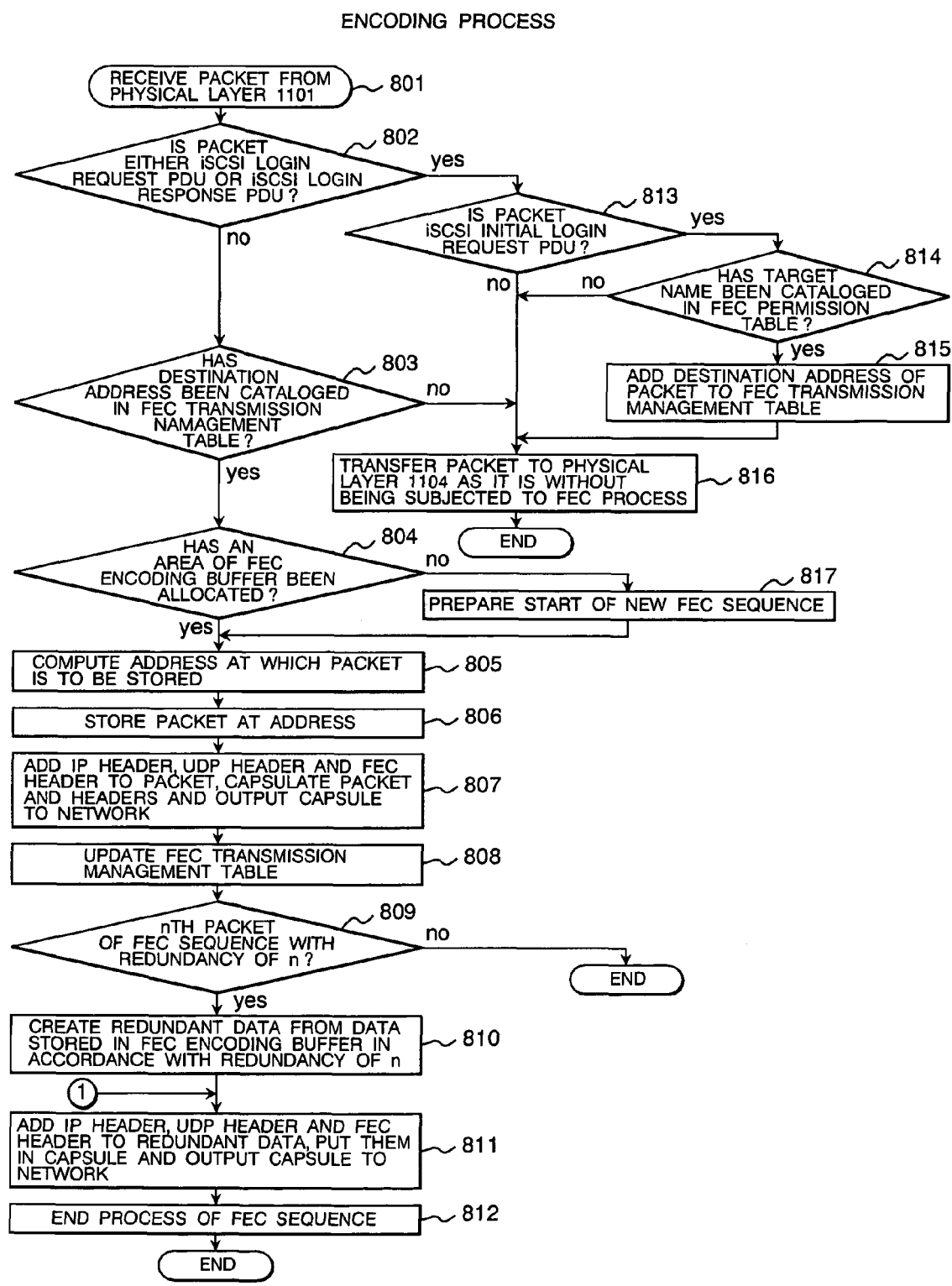
FIG. 8 shows a flowchart referred to in explaining operations of an FEC encoding process carried out in a transmission of data.
Figure 9:
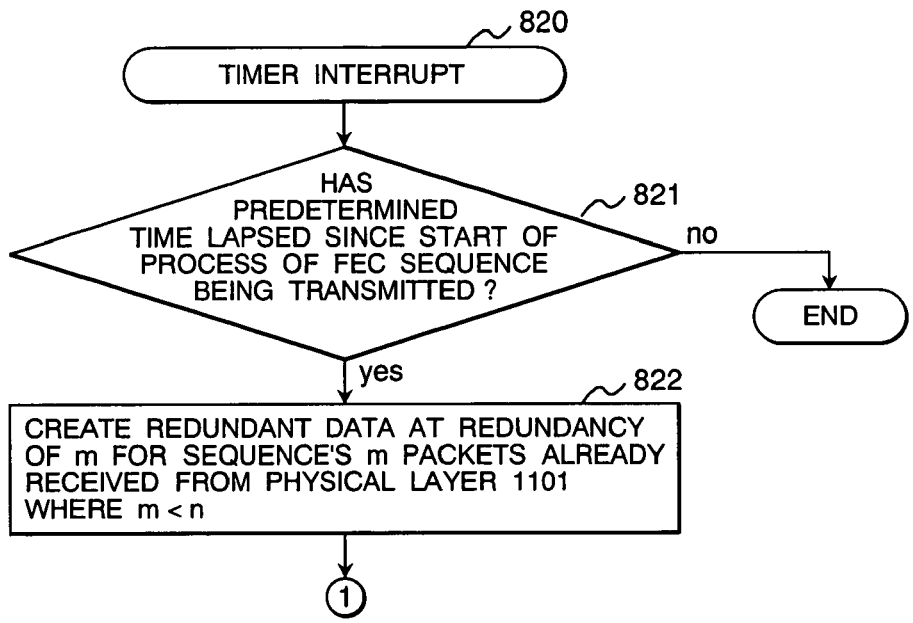
FIG. 9 shows a flowchart referred to in explaining operations carried out in an FEC encoding process for insufficient transmitted data.
Figure 10:
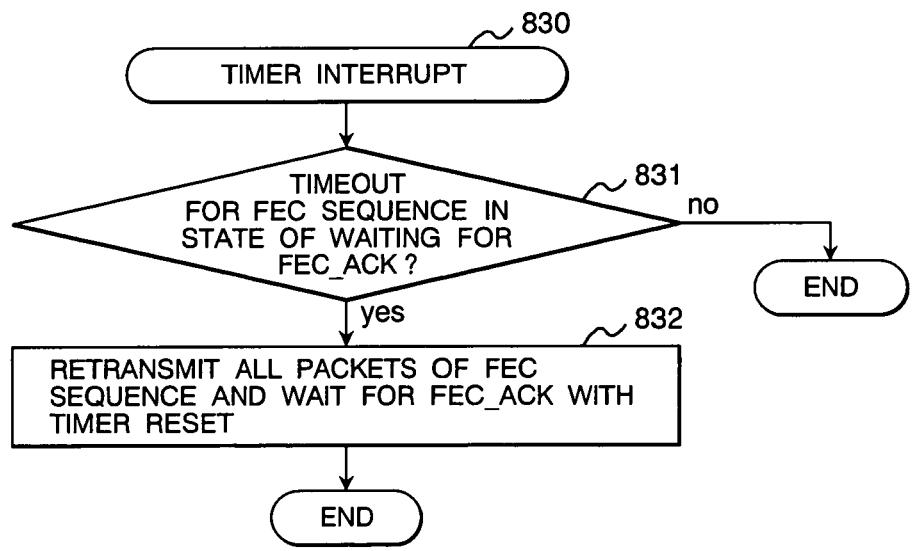
FIG. 10 shows a flowchart referred to in explaining operations of a process to retransmit an FEC packet.

By referring to FIGS. 8 to 10, the following description explains operations of an FEC redundancy conversion process, which is carried out in an FEC conversion adapter when data is transmitted.

(A) Encoding Process

First of all, an encoding process is explained by referring to a flowchart shown in FIG. 8. Data generated in the storage apparatus 100 is transferred from the channel adapter 107 to the FEC conversion adapter 110 by way of the high-speed IP interface as a group of iSCSI packets. At a step 801, this group of packets is received by a physical layer 1101 of the FEC conversion adapter 110 and temporarily stored in the buffer 1102 of the FEC conversion adapter 110. Then, at the next step 802, the FEC encoding unit 113 checks a packet in order to form a judgment as to whether or not the packet is either an iSCSI login request PDU or an iSCSI login response PDU. If the outcome of the judgment is a negation, the flow of the process goes on to a step 803 at which the FEC transmission management table 117 is referenced to form a judgment as to whether or not the destination address has been cataloged in the FEC transmission management table 117. If the destination address has been cataloged in the FEC transmission management table 117, the flow of the process goes on to a step 804 to form a judgment as to whether a storage area of the FEC encoding buffer 1103 has been allocated. If the destination address has not been cataloged in the FEC transmission management table 117, on the other hand, the flow of the process goes on to a step 816 at which the packets are transferred to the physical layer 1104 by way of the buffer 1103 as packet-group data with the format unchanged as it is, that is, with the TCP/IP format, without being subjected to an FEC process, before being finally output to the IP network 400. If the outcome of the judgment formed at the step 804 indicates that no storage area of the FEC encoding buffer 1103 has been allocated, the flow of the process goes on to a step 817 at which a start of a new FEC sequence is prepared.

If the FEC encoding buffer described above has been allocated, on the other hand, the flow of the process goes on to a step 805 to calculate an address at which the packet is to be stored. Then, at the next step 806, the packet is stored in the address as it is. That is to say, the whole packet is capsulated so that the packet's IP header, TCP header and TCP data are stored in the buffer as they are. Subsequently, at the next step 807, an IP header, a UDP header and an FEC header are added to the packet to form a capsule, which is output to the IP network 400 by way of the physical layer 1104. Areas of the FEC header contain their respective pieces of information. To be more specific, an FEC header type contains FEC data and a data length contains the length of the packet, which has been capsulated. Other areas contain pieces of information according to the contents of the FEC transmission management table 117.

Then, at the next step 808, information stored in the FEC transmission management table 117 is updated. To be more specific, the FEC transmission management table 117 is updated by incrementing the number of packets for this FEC sequence by one. This updating operation is carried out to manage the total number of transmitted packets.

Subsequently, the flow of the process goes on to the next step 809 to form a judgment as to whether or not the transmitted packet is the nth packet for the FEC sequence (with a redundancy of n). If the packet is not the nth packet, the process is ended. If the packet is the nth packet, on the other hand, the flow of the process goes on to a step 810 at which redundant data is created from data stored in the FEC encoding buffer in accordance with the redundancy of n and to be finally transmitted as the (n+1)th packet. Then, at the next step 811, an IP header, a UDP header and an FEC header are added to the redundant data and the redundant data including the IP header, the UDP header and the FEC header is put in a capsule, which is output to the IP network 400 by way of the physical layer 1104. Finally, at the next step 812, the sequence of FEC processing operations is ended. If the FEC retransmission function is provided, the sequence of FEC processing operations is ended by waiting for an FEC_ACK. If the FEC retransmission function is not provided, on the other hand, the sequence of FEC processing operations is ended by making the FEC encoding buffer available.

If the outcome of the judgment formed at the step 802 is an affirmation, on the other hand, the flow of the process goes on to a step 813 to form a judgment as to whether or not the group of packets is an iSCSI initial login request PDU. If the outcome of the judgment is an affirmation, the flow of the process goes on to a step 814 at which the FEC permission table is checked in order to form a judgment as to whether or not the target name has been cataloged in the table. If the target name has been cataloged in the FEC permission table, the flow of the process goes on to a step 815 at which the destination address of the packet is cataloged in the FEC transmission management table before proceeding to the next processing. If the outcome of the judgment formed at the step 813 is a negation, on the other hand, the flow of the process goes on to a step 816 at which the packet is transferred to the physical layer 1104 as it is without being subjected to the FEC processing. Finally, the process is ended.

(B) Processing Operations for Insufficient Data to be Transmitted

By referring to a flowchart shown in FIG. 9, the following description explains processing operations, which are carried out in a case where data to be transmitted is insufficient. This process is carried out to form a judgment as to whether or not the normal number of packets has been received from the channel adapter.

When a transmission of a packet group in a certain transmission sequence is started, a timer interrupt is generated in order to commence a counting operation of a timer at a step 820. Then, at the next step 821, the timer is checked in order to form a judgment as to whether or not a predetermined period of time has lapsed since the start of the FEC sequence process to transmit data. If the predetermined period of time has not lapsed, the process is ended. If the predetermined period of time has lapsed, on the other hand, the flow of the process goes on to a step 822 at which redundant data with an FEC sequence redundancy of m is created for m packets already received from the physical layer 1101 in this FEC sequence. It is to be noted that the redundancy of m is stored in the FEC header of the redundant packet.

(C) Operations to Retransmit FEC Packets

Next, operations to retransmit an FEC packet are explained by referring to a flowchart shown in FIG. 10. In the basic sequence of this process, when an FEC packet is received on the receiver side, an FEC_ACK is transmitted to the transmitter side in response to the packet. By receiving this FEC_ACK, the transmitter side is capable of recognizing that the transmitted packet has been received correctly by the partner.

When the transmitter side transmits an FEC packet, timer interrupt processing is carried out at a step 830. Then, at the next step 831, the timer is checked in order to form a judgment on a timeout for the FEC sequence in a state of waiting for an FEC_ACK. If the outcome of the judgment indicates that a timeout has not occurred, the process is ended. If the outcome of the judgment formed at the step 831 indicates that a timeout has occurred, on the other hand, the flow of the process goes on to a step 832 at which processing is carried out to retransmit all packets for this FEC sequence.

By the same token, the timer is reset to start the operation to measure the time to wait for an FEC_ACK for all the retransmitted packets.

Figure 11:
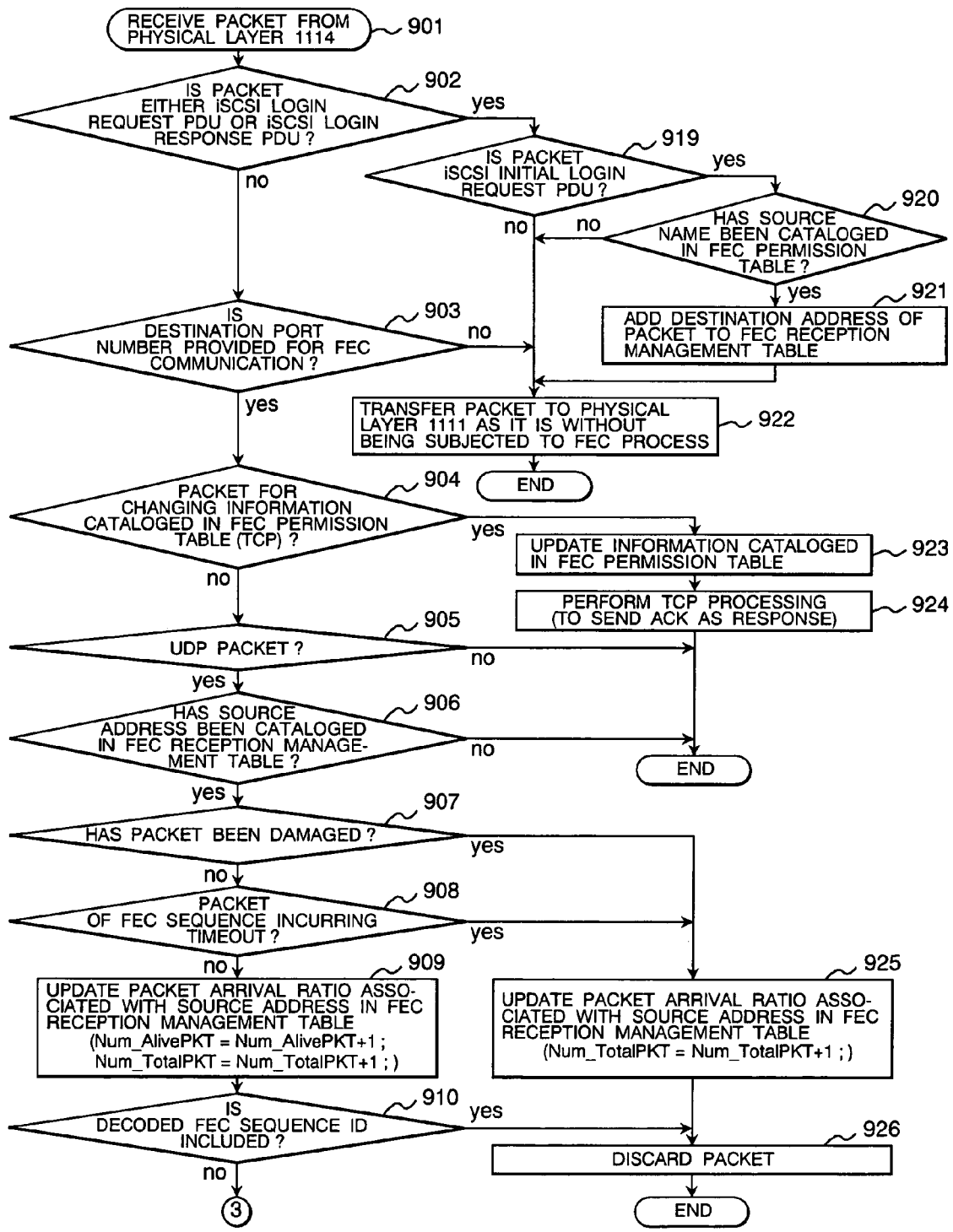
FIG. 11 shows a flowchart referred to in explaining operations of an FEC decoding process in a reception of data.
Figure 12:
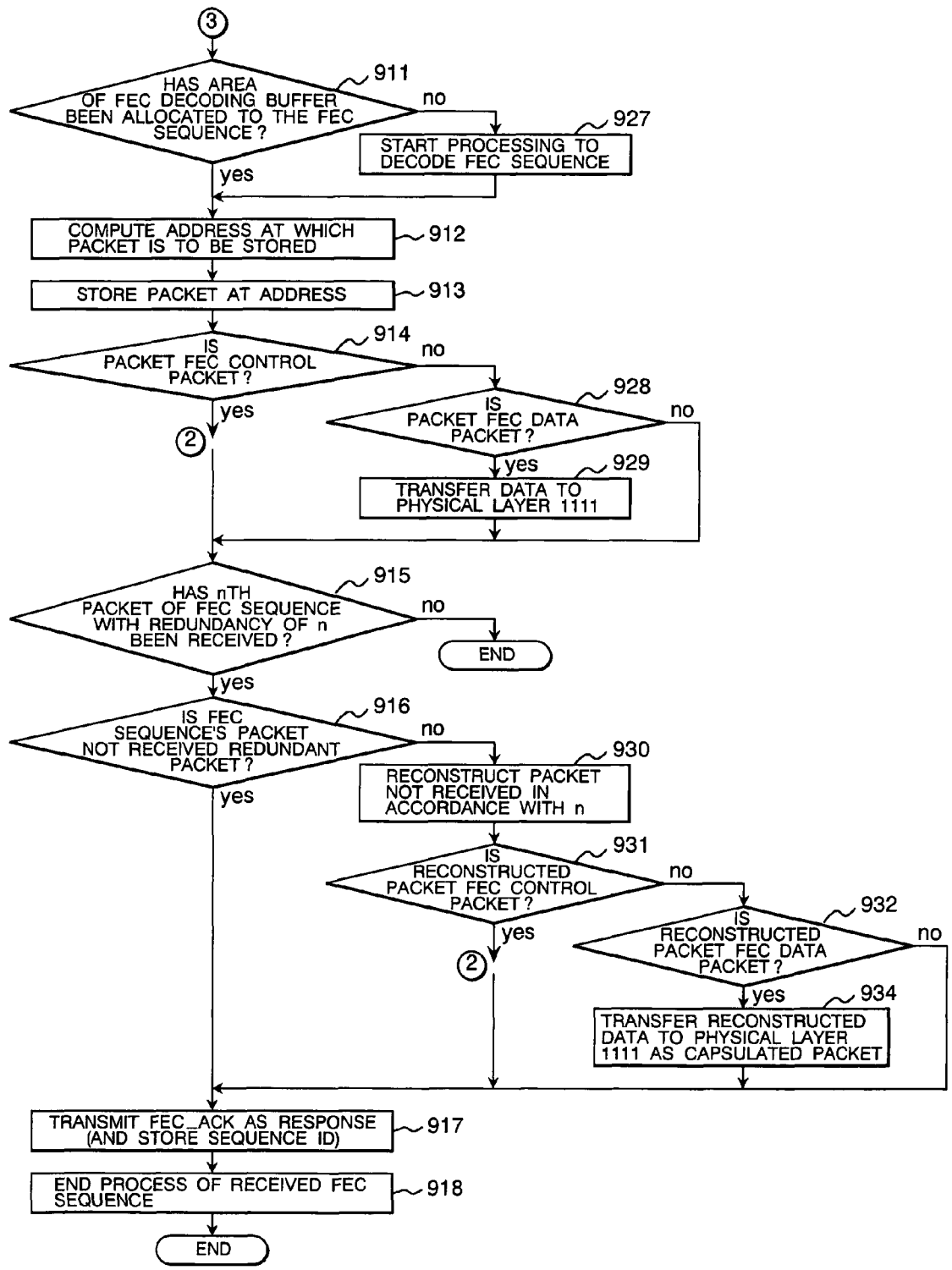
FIG. 12 shows a continuation flowchart referred to in explaining the operations of the FEC decoding process in the reception of data.

By referring to a flowchart shown in FIGS. 11 and 12, the following description explains operations of an FEC decoding process, which is carried out by the FEC conversion adapter 110 when data is received. The flowchart shown in FIGS. 11 and 12 begins with a step 901 at which a packet is received from the physical layer 1114. Then, at the next step 902, the packet is checked in order to form a judgment as to whether or not the packet is either an iSCSI login request PDU or an iSCSI login response PDU. If the outcome of the judgment is an affirmation, the flow of the process goes on to a step 919 to form a judgment as to whether or not this packet is an iSCSI initial login request. If the outcome of the judgment is an affirmation, the flow of the process goes on to a step 920 to form a judgment as to whether or not the source name (that is, the iSCSI Name) has been cataloged in the FEC permission table. If the source name has been cataloged in the FEC permission table, the flow of the process goes on to a step 921 at which the destination address of the packet is cataloged in the FEC reception management table.

If the outcome of the judgment formed at the step 902 is a negation, on the other hand, the flow of the process goes on to a step 903 to form a judgment as to whether or not the destination port number has been provided for FEC communication use. If the outcome of the judgment formed at the step 903 is a negation, the flow of the process goes on to a step 922 at which the packet is transferred to the physical layer 1111 as it is without being subjected to an FEC process. If the outcome of the judgment formed at the step 903 indicates that the destination port number has been provided for FEC communication use, on the other hand, the flow of the process goes on to a step 904 to form a judgment as to whether or not the packet is a packet for changing information cataloged in the FEC permission table. If the outcome of the judgment is an affirmation, the flow of the process goes on to a step 923 at which the contents of the FEC permission table are updated. Then, at the next step 924, TCP processing is carried out. That is to say, an ACK is transmitted as a response and the process is ended.

If the outcome of the judgment indicates that the packet is not a TCP packet, on the other hand, the flow of the process goes on to a step 905 at which the packet is checked in order to form a judgment as to whether or not the packet is an UDP packet. If the packet is an UDP packet, the flow of the process goes on to a step 906 to form a judgment as to whether or not the source address of the packet has been cataloged in the FEC reception management table. If the source address of the packet has been cataloged in the FEC reception management table, the flow of the process goes on to a step 907 to form a judgment as to whether or not the packet has been destroyed. If the packet has not been destroyed, the flow of the process goes on to a step 908 to form a judgment as to whether or not the packet is a packet of an FEC sequence for which a timeout has occurred. If the outcome of the judgment is an affirmation, the flow of the process goes on to a step 925 at which the packet arrival ratio for the packet is found from the FEC reception management table by using the source address and updated. Then, at the next step 926, the packet is discarded and the process is ended.

If the outcome of the judgment formed at the step 908 indicates that the packet is not a packet of an FEC sequence for which a timeout has occurred, on the other hand, the flow of the process goes on to a step 909 at which the packet arrival ratio for the packet is found from the FEC reception management table by using the source address and updated. Then, the flow of the process goes on to a step 910 at which the packet is checked in order to form a judgment as to whether or not the packet includes an ID indicating a decoded FEC sequence. If the outcome of the judgment is an affirmation, the flow of the process goes on to the step 926 at which the packet is discarded and the process is ended. If the packet does not include an ID indicating a decoded FEC sequence, on the other hand, the flow of the process goes on to a step 911 at which the FEC decoding buffer is checked in order to form a judgment as to whether or not an area of the FEC decoding buffer has been allocated to the FEC sequence. If the outcome of the judgment is a negation, on the other hand, the flow of the process goes on to the step 927 at which processing to decode the FEC sequence is carried out. In this processing, typically, an available area in the FEC decoding buffer is allocated and a timer is set.

If the outcome of the judgment formed at the step 911 is an affirmation, the flow of the process goes on to a step 912 to compute an address at which the packet is to be stored. Then, at the next step 913, the packet is stored at the address. Subsequently, at the next step 914, the packet is checked in order to form a judgment as to whether or not the packet is an FEC control packet. If the outcome of the judgment is a negation, the flow of the process goes on to a step 928 at which the packet is checked in order to form a judgment as to whether or not the packet is a data packet. If the packet is a data packet, the flow of the process goes on to a step 929 at which the packet is transferred to the physical layer 1111 as a packet with its data capsulated.

Then, the flow of the process goes on to a step 915 to form a judgment as to whether or not the packet is received to the nth in the FEC sequence of the packet, where the redundancy of the FEC is n in this case. If the outcome of the judgment is an affirmation, the flow of the process goes on to a step 916 to form a judgment as to whether or not the FEC sequence's packet not received is a redundant packet. If the packet not received is a redundant packet, the flow of the process goes on to a step 917 at which an FEC_ACK is transmitted in response to the packet and a sequence ID is stored. Then, at the next step 918, the process to handle this received FEC sequence is ended. To put it in detail, operations are carried out to de-allocate the allocated area of the FEC decoding buffer and temporarily store the sequence ID in the FEC reception management table as an ID of a processed sequence.

If the outcome of the judgment formed at the step 916 to determine whether or not the FEC sequence's packet not received is a redundant packet is not an affirmation, on the other hand, the flow of the process goes on to a step 930 at which the packet not received is reconstructed in accordance with a redundancy of n. It is to be noted that, if the FEC header of the redundant packet generated at the step 822 shows a redundancy of m, the packet not received is also reconstructed in accordance with the redundancy of m too. Then, the flow of the process goes on to the next step 931 to form a judgment as to whether or not the reconstructed packet is an FEC control packet. If the outcome of the judgment is not an affirmation, the flow of the process goes on to a step 932 to form a judgment as to whether or not the reconstructed packet is an FEC data packet. If the reconstructed packet is an FEC data packet, the flow of the process goes on to a step 934 at which a packet with the reconstructed data capsulated is transferred to the physical layer 1111. It is to be noted that processing of an FEC control packet will be described later.

Figure 13:
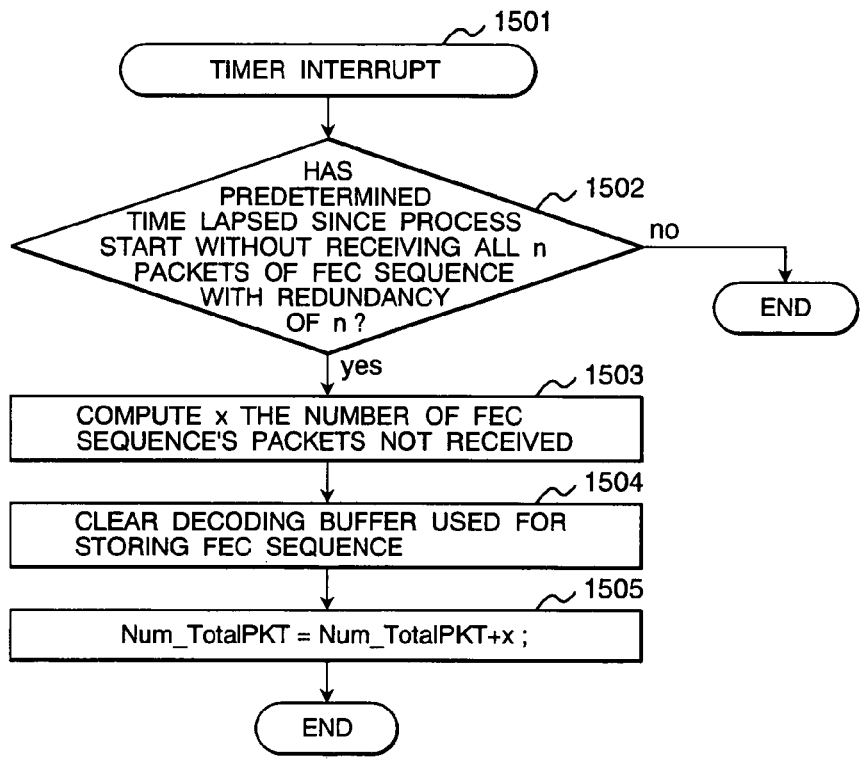
FIG. 13 shows a flowchart referred to in explaining operations of a process carried out in the event of an error in a reception of data.
Figure 14:
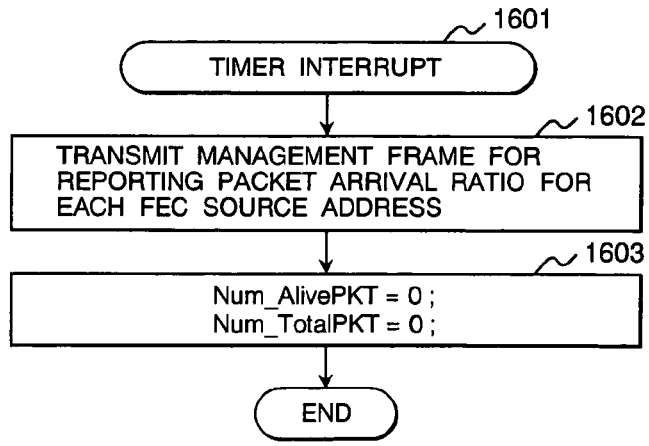
FIG. 14 shows a flowchart referred to in explaining operations of a process to report a packet loss ratio in a reception of data.
Figure 15:
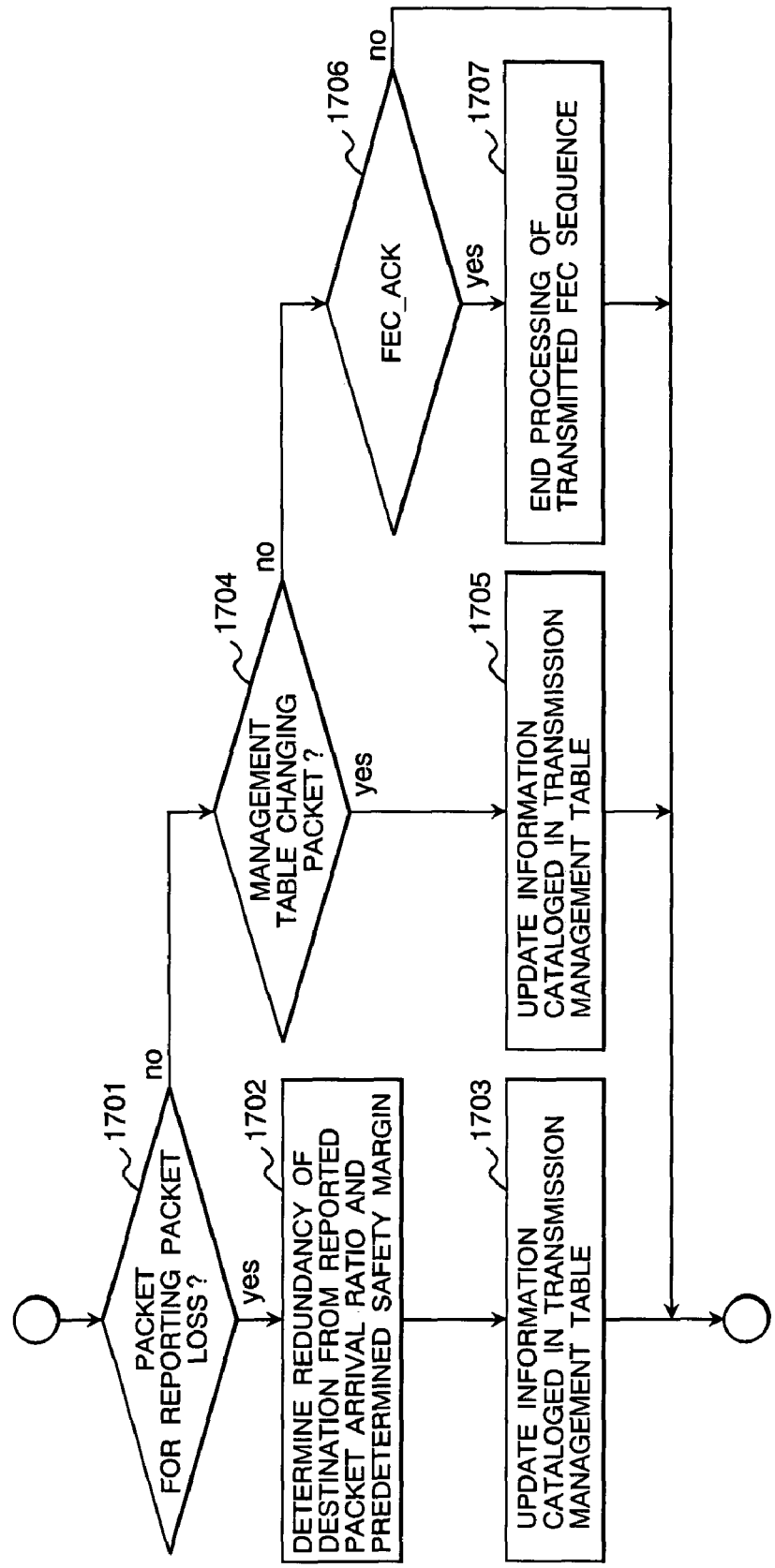
FIG. 15 shows a flowchart referred to in explaining operations of a process carried out for a reported packet loss ratio.

By referring to flowcharts shown in FIGS. 13 to 15, the following description explains operations of a process carried out in the event of an error detected in reception of data and a process related to loss of a packet.

(A) Processing of Insufficient Received Data

This processing is a process, which is carried out when data of an FEC sequence completing an FEC redundancy process is not sufficient so that the FEC sequence cannot be decoded within a predetermined period of time.

The flowchart shown in FIG. 13 begins with a step 1501 at which a timer interrupt is generated when reception of a packet of a certain sequence is started. Then, the flow of the process goes on to the next step 1502 to form a judgment as to whether or not a predetermined period of time has lapsed since the start of the process before the nth packet of a certain sequence with a redundancy of n is received. If the period of time has lapsed before the nth packet is received, the flow of the process goes on to a step 1503 to compute a variable x representing the number of FEC-sequence packets not received. Typically, the variable x is computed by subtracting the number of received packets from n (n–the number of received packets). Subsequently, at the next step 1504, the decoding buffer used for storing the FEC sequence is cleared. Then, at the next step 1505, the packet arrival ratio is computed and the process is ended. That is to say, the FEC sequence's packets not received are regarded as lost packets in computing the packet arrival ratio. A packet arrival ratio obtained as a result of the computation is used as an updated packet arrival ratio.

(B) Process to Report Packet Arrival Ratio

The computed packet arrival ratio is cataloged in the FEC reception management table on the receiver side and also transmitted to the transmitter side as well. On the transmitter side, a packet loss ratio is used to find a redundancy, which is cataloged in the FEC transmission management table.

The flowchart shown in FIG. 14 begins with a step 1601 at which a timer interrupt is generated on the receiver side. Then, at the next step 1602, a management frame used for reporting a packet arrival ratio is transmitted for each of FEC source addresses. Subsequently, at the next step 1603, a packet used for reporting the packet arrival ratio is stored in the FEC encoding buffer. The packet arrival ratio (Num_Alive PKT) is a ratio of the number of FEC data packet received prior to the occurrence of a timeout without being destroyed to the number of transmitted FEC data packets.

(C): Processing of FEC Control Packets

The flowchart shown in FIG. 15 begins with a step 1701 at which a received packet is checked in order to form a judgment as to whether or not the packet is a packet used for reporting a packet loss ratio. If the received packet is a packet used for reporting a packet loss ratio, the flow of the process goes on to a step 1702 at which a redundancy for a communication destination is computed from the reported packet loss ratio and a safety margin determined in advance. The computed redundancy is cataloged in the FEC transmission management table as an update value of a corresponding entry. If the outcome of the judgment formed at the step 1701 indicates that the received packet is not a packet used for reporting a packet loss ratio, on the other hand, the flow of the process goes on to a step 1704 at which the received packet is checked in order to form a judgment as to whether or not the packet is a packet used for changing information stored in the FEC transmission management table. If the outcome of the judgment formed at the step 1704 is an affirmation, the flow of the process goes on to a step 1705 at which the information stored in the FEC transmission management table is updated. If the received packet is not a packet used for changing information stored in the FEC transmission management table, on the other hand, the flow of the process goes on to a step 1706 at which the received packet is checked in order to form a judgment as to whether or not the packet is a packet containing FEC_ACK. If the outcome of the judgment is an affirmation, the flow of the process goes on to a step 1707 at which the processing of the transmitted FEC sequence is ended. In this processing, the allocated area of the FEC encoding buffer is released, the state of waiting for FEC_ACK is terminated and the relevant information is deleted from the FEC transmission management table.

Embodiments of the present invention have been explained so far. However, the scope of the present invention is not limited to the embodiments. That is to say, a variety of changes can be made to the embodiments.

Figure 16:
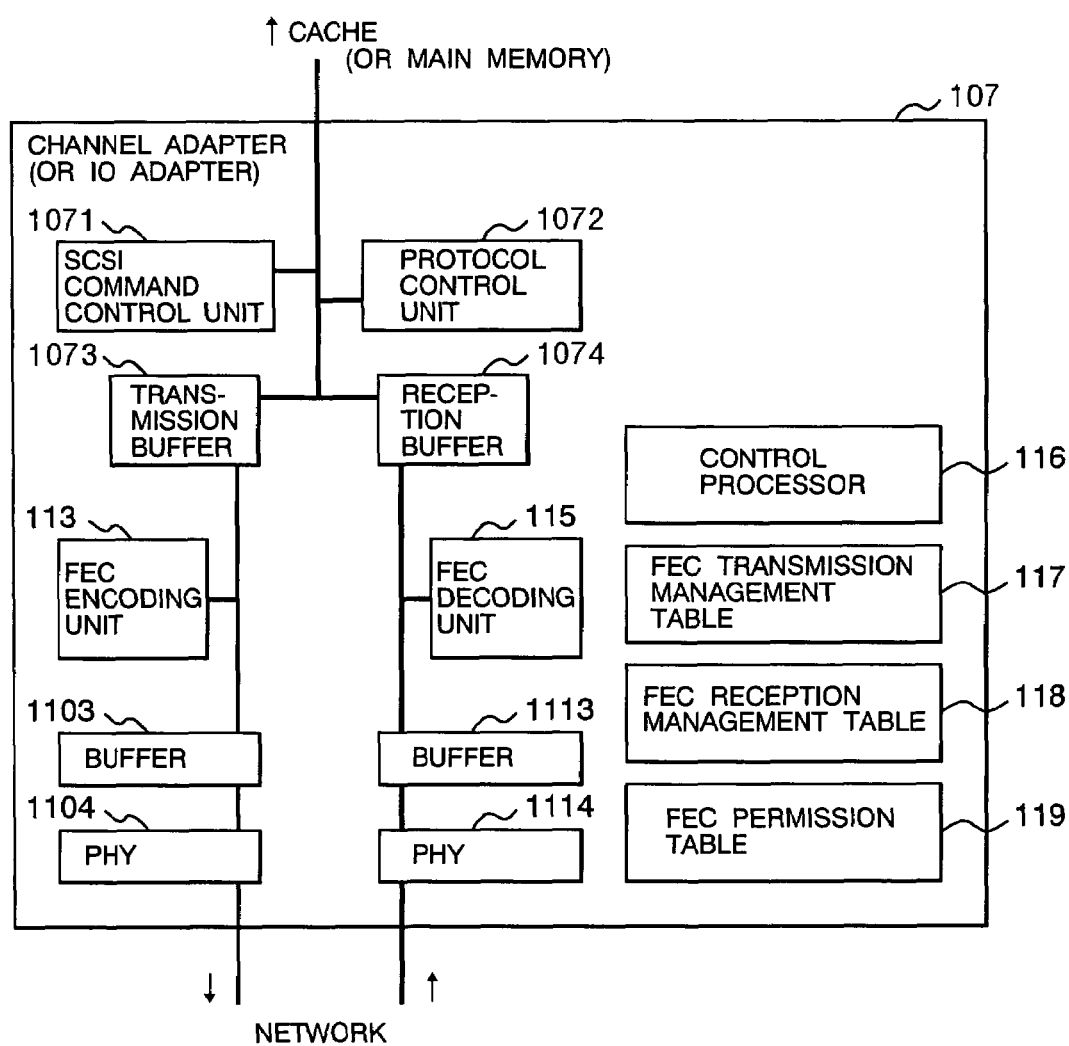
FIG. 16 is a block diagram showing a storage system implemented by a further embodiment of the present invention.

FIG. 16 is a block diagram showing an embodiment implementing a modified configuration of the channel adapter employed in the storage apparatus. This channel adapter 107 also includes some of the functions of the FEC conversion adapter described earlier. To be more specific, the channel adapter 107 also includes components of the FEC conversion adapter, except components on the channel-adapter side, in addition to an SCSI command control unit 1071, a protocol control unit 1072, a transmission buffer 1073 and a reception buffer 1074. The transmission buffer 1073 and the reception buffer 1074 are employed as common buffers. The excluded components on the channel-adapter side are the buffers 1102 and 1112 and the physical layers 1101 and 1111. The remaining configuration is the same as that shown in FIG. 2.

In addition, in the embodiments described above, data is transmitted by changing the redundancy to a value suitable for a transmission destination in accordance with the packet loss ratio. However, it is also possible to change intervals, at which packets are transmitted, in accordance with the packet loss ratio. In a broad sense, the data transmission state is changed in accordance with the packet loss ratio.

In accordance with the preferred embodiments, it is possible to provide a storage apparatus conforming to an iSCSI protocol adopting the FEC technique. In addition, by feeding a packet loss state grasped on the receiver side back to the transmitter side, the transmitter side is capable of transmitting data by changing the state of FEC processing and the data transmission redundancy to a value suitable for a transmission destination whereas the receiver side is capable of decoding the received data accordingly. As a result, it is possible to provide a storage system capable of restoring data even if packets have been lost.

What is claimed is:

1. An information-processing apparatus for converting information generated by an information generation unit into packets to be transmitted to a network and for receiving packets from said network, said information-processing apparatus comprising:
    a means for performing a TCP/IP conversion process to convert information generated by said information generation unit into a TCP/IP packet group to be transmitted to said network;
    a management unit for managing as to whether or not a transmission partner is a target of an FEC (Forward Error Correction) communication, managing FEC redundancies each provided for a transmission partner connected to said network, and holding a correspondence relationship associating each transmission partner and a corresponding FEC redundancy;
    an encoding unit for carrying out an FEC encoding process on said TCP/IP packet group, which has been subjected to said TCP/IP conversion process, by retrieving and applying an FEC redundancy held in said management unit for its corresponding transmission partner identified in the TCP/IP packet group; and
    a decoding unit for carrying out an FEC decoding process on a packet group received from said network;
    wherein said management unit has a table stored in a memory, an iSCSI packet group is managed corresponding to the transmission partner, and each FEC redundancy said table is directly related to a state of packet loss determined for said transmission partner for which said FEC redundancy is associated in said table.

2. An information-processing apparatus according to claim 1, wherein:
    said information-processing apparatus is a storage apparatus having a disk drive in said information generation unit;
    said means for performing a TCP/IP conversion process to convert information generated by said information generation unit into a TCP/IP packet group is an iSCSI-protocol processing means;
    said encoding unit encodes an iSCSI packet group; and
    said decoding unit carries out a decoding process on said packet group received from said network in order to produce an iSCSI packet group.

3. An information-processing apparatus according to claim 1, wherein data completing an FEC encoding process in said encoding unit is transmitted to said network as a UDP packet group, and the UDP packet group received from said network is subjected to an FEC decoding process carried out by said decoding unit.

4. A repeater for transmitting and receiving packet data through a port on a side of a network and a port on a side of a storage apparatus, said repeater comprising:
    a transmission management table used for cataloging and managing FEC redundancies each provided for a transmission destination connected to said network, and for holding a correspondence relationship associating each transmission partner and a corresponding FEC redundancy;
    a reception management table used for cataloging and managing iSCSI data depending on whether or not a transmission partner is a target of an FEC communication;
    an encoding unit for carrying out an FEC encoding process on iSCSI-layer data, which has been generated by a storage apparatus in the form of packets, and providing said data with an FEC redundancy associated with a transmission destination by referencing said transmission management table; and
    a decoding unit for carrying out an FEC decoding process on packet data, which has been received from said network, by referencing said reception management table in order to restore said iSCSI-layer data.

5. A repeater according to claim 4, wherein:
    said transmission management table is a table also used for cataloging an address of each transmission destination capable of carrying out an FEC process;
    said reception management table is a table also used for cataloging an address of each transmission source capable of carrying out an FEC process;
    if the address of a transmission destination is found to have been cataloged in said transmission management table in reference to said transmission management table, iSCSI data is subjected to said FEC encoding process in said encoding unit and transmitted to said network;

if the address of a transmission destination is found to have not been cataloged in said transmission management table in reference to said transmission management table, iSCSI data is transmitted to said network without being subjected to said FEC encoding process in said encoding unit;

if the address of a transmission source transmitting packet data received from said network is found to have been cataloged in said reception management table in reference to said reception management table, said packet data is subjected to said FEC decoding process in said decoding unit in order to restore said iSCSI data; and if the address of a transmission source transmitting packet data received from said network is found to have not been cataloged in said reception management table in reference to said reception management table, said packet data is transferred to an iSCSI layer without being subjected to said FEC decoding process.

6. A repeater according to claim 4, further comprising a means for changing information cataloged in said transmission management table and information cataloged in said reception management table by analyzing contents of a control frame received from said network in order to add or delete an address to or from said transmission management table or said reception management table.

7. A communication method for transmitting data from an apparatus adopting an iSCSI protocol to another apparatus adopting said iSCSI protocol, said communication method comprising:

a first communication mode for transmitting and receiving data in an FEC communication mode;

a second communication mode for transmitting and receiving data in a TCP/IP communication mode;

cataloging iSCSI Names each representing a partner, which serves as a data-communication destination, in a memory and managing said iSCSI Names;

cataloging FEC redundancies each provided for and associated with a data-communication destination in a memory so as to create a correspondence relationship associating each transmission partner and a corresponding FEC redundancy, and managing said FEC redundancies;

forming a judgment as to whether or not a specific iSCSI Name of a specific partner serving as a specific data-communication destination has been cataloged in said memory;

carrying out an FEC process, by retrieving and applying an FEC redundancy cataloged for and associated with said specific data-communication destination in said memory, on data to be transmitted, and transmitting said data completing said FEC process to said specific data-communication destination in said first communication mode if an outcome of said judgment indicates that said specific iSCSI Name has been cataloged in said memory; and transmitting said data to be transmitted to said specific data-communication destination in said second communication mode in a case where an outcome of said judgment indicates that said specific iSCSI Name has not been cataloged in said memory.

8. A communication method according to claim 7, further comprising:

finding a loss ratio of transmitted packets for each data-communication destination and managing said loss ratios; and changing said redundancy cataloged for a particular data-communication destination in said redundancy memory in accordance with said loss ratio found for said particular data-communication destination.

9. A communication method according to claim 7, further comprising:

cataloging FEC decoding buffer control information each provided for a data-communication destination in a memory and managing said FEC decoding buffer control information in an apparatus on a reception side;

forming a judgment as to whether or not the iSCSI Name of a specific transmission source has been cataloged in said memory in a process to receive specific data; and carrying out a restoration process to convert said specific data into iSCSI data on the basis of said FEC decoding buffer control information cataloged for said specific transmission source in said memory if an outcome of said judgment indicates that the iSCSI Name of said specific transmission source has been cataloged in said memory.

10. A communication method according to claim 7, further comprising:

transmitting an ACK to a transmission source in response to transmitted data if iSCSI data can be restored in an apparatus on a reception side or transmitting no ACK to a transmission source in response to transmitted data if iSCSI data cannot be restored in an apparatus on a reception side; and carrying out an FEC process on the same data as said transmitted data and retransmitting said data completing said FEC process in said first communication mode to the same apparatus as said apparatus on said reception side if no ACK is received by an apparatus serving as said transmission source.

11. A storage system comprising a plurality of storage apparatus connected to each other by a network, by way of which data is exchanged among said storage apparatus, each of said storage apparatus comprising:

a disk drive for recording data;

a disk adapter connected to said disk drive;

a cache memory connected to said disk adapter;

a channel adapter connected to said cache memory;

a means for carrying out a conversion process to convert data originated from said disk drive into an iSCSI packet group conforming to a TCP/IP;

a management unit for managing as to whether or not a transmission partner is a target of an FEC (Forward Error Correction) communication, managing FEC redundancies each provided for a transmission partner, and holding a correspondence relationship associating each transmission partner and a corresponding FEC redundancy;

an encoding unit for carrying out an FEC encoding process on said iSCSI packet group resulting from said conversion process and conforming to said TCP/IP by retrieving and applying an FEC redundancy held for its corresponding transmission partner in said management unit; and a decoding unit for carrying out an FEC decoding process on information included in a packet group received from said network;

wherein in said management unit, an iSCSI packet group is managed corresponding to a transmission partner.

12. A storage system wherein data is exchanged through a network among storage apparatus each comprising: an application layer for recording and processing data; an iSCSI layer for carrying out an SCSI process on data of said application layer; and TCP and IP layers for carrying out a TCP/IP process on data of said iSCSI layer, said storage system comprising:
an FEC encoding process layer for carrying out an encoding process to add a redundancy code to data from said iSCSI layer;
a UDP layer for carrying out a UDP process on data completing said encoding process; and
an IP layer for carrying out an IP process on data from said UDP layer;
wherein said FEC encoding process layer adds said redundancy code with an FEC redundancy retrieved from a table that holds a correspondence relationship associating each transmission partner and a corresponding FEC redundancy.

13. A storage system according to claim 12, further comprising an FEC decoding process layer for decoding data coming from said network, completing said IP process at said IP layer and completing said UDP process at said UDP layer.

14. A storage system according to claim 12, further comprising a means for changing redundancy of a redundant code to a value suitable for a transmission destination at said FEC encoding process layer.

15. A communication method for transmitting data by way of a network from an apparatus adopting an iSCSI protocol to another apparatus adopting said iSCSI protocol, said communication method comprising:
a first communication mode for transmitting and receiving data in an FEC communication mode including an FEC process;
a second communication mode for transmitting and receiving data in a TCP/IP communication mode;
forming a judgment as to whether or not a partner serving as a data communication destination has an iSCSI layer on the basis of an iSCSI Name;
carrying out an FEC process based upon an FEC redundancy provided for a communication partner on data to be transmitted and transmitting the data completing said FEC process to said partner in said first communication mode in a case where an outcome of said judgment indicates that said partner has an iSCSI layer, wherein said FEC redundancy is retrieved from a table holding a correspondence relationship associating each transmission partner and a corresponding FEC redundancy; and
transmitting the data to a communication partner in said second communication mode in a case where an outcome of said judgment indicates that said partner does not have an iSCSI layer.

16. A storage system according to claim 11, wherein:
said conversion means, said management unit, said encoding unit and said decoding unit are accommodated in an FEC conversion adapter; and
said FEC conversion adapter is connected to said channel adapter through an interface.

17. A storage system according to claim 11, wherein said storage system has a duplicate component of each of said disk drive, said disk adapter, said cache memory, said channel adapter and said FEC conversion adapter.

18. A storage system acording to claim 11, further comprising a server for management use connected to a network, wherein said server issues commands to add and delete transmission destinations' addresses control by said management unit.

19. A repeater according to claim 4, further comprising a table used for cataloging an iSCSI Nam of each data transmission destination, wherein an FEC communication is permitted in a transmission of data to a specific data transmission destination only if the iSCSI Name of said specific data transmission destination has been cataloged in said table.

* * * * *